Patented July 29, 1930

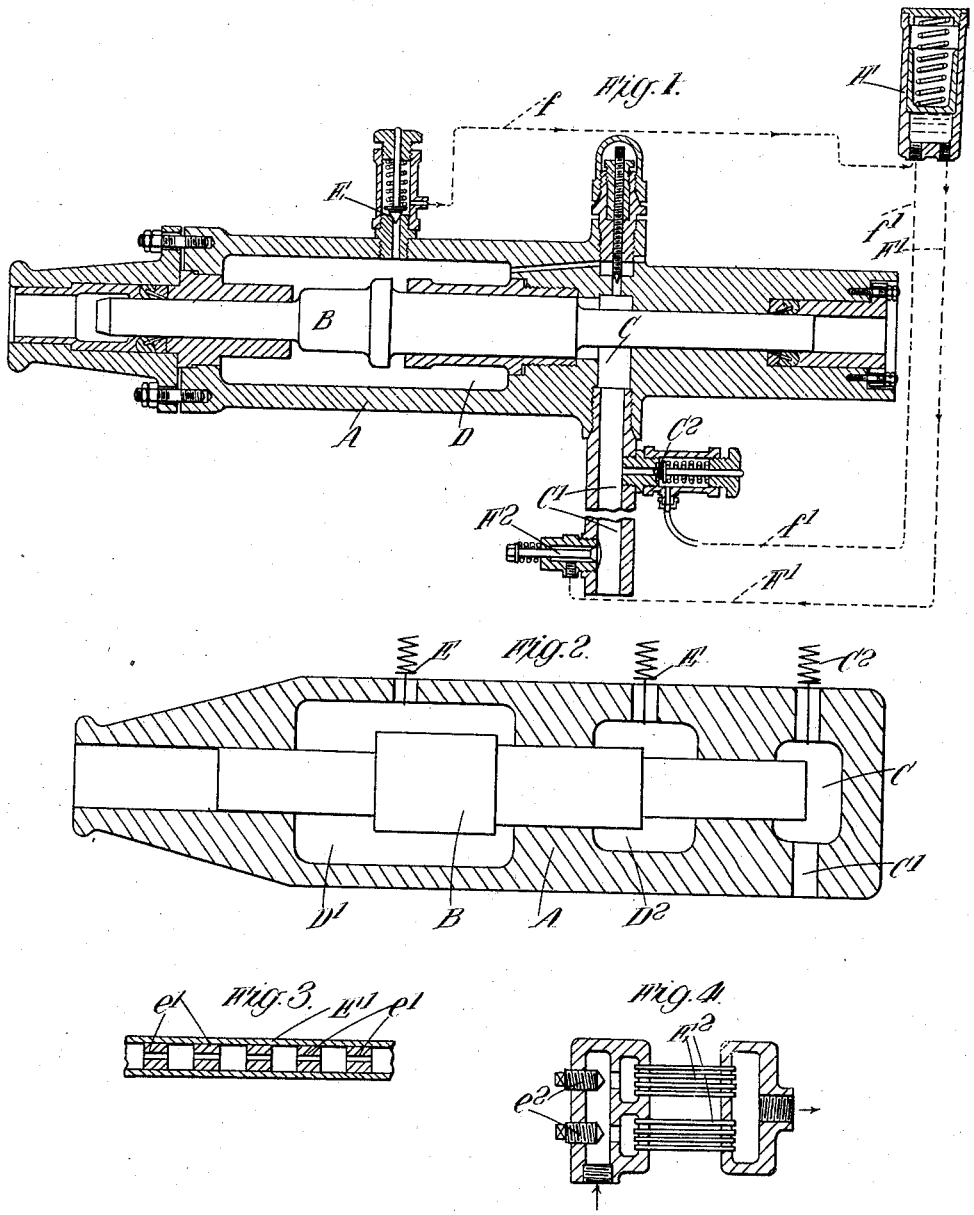

1,771,672

UNITED STATES PATENT OFFICE

WILLIAM RUSSELL DEGENHARDT, OF LONDON, ALLAN FRED DE FRAINE, OF WEMBLEY, AND ROBERT HENRY BICKNELL, DECEASED, LATE OF WESTMINSTER, ENGLAND, BY ROBERT ALAN WIMBERLEY BICKNELL, OF LONDON, ENGLAND, AND ARTHUR BICKNELL, OF BIRMINGHAM, ENGLAND, LEGAL REPRESENTATIVES OF ROBERT HENRY BICKNELL, DECEASED, ASSIGNORS TO THE FRANCOIS CEMENTATION COMPANY LIMITED, OF DONCASTER, ENGLAND, A BRITISH COMPANY

LIQUID SPRING SUSPENSION FOR WAVE TRANSMISSION TOOLS

Application filed February 28, 1928, Serial No. 257,767, and in Great Britain March 25, 1927.

This invention relates to the resilient or spring suspension, by means of a body or bodies of liquid, of the operative portions of tools (more especially percussion tools) operated by liquid wave transmission. The pressure in the liquid spring chamber or chambers (i. e. the chamber or chambers containing the said body or bodies of liquid) is liable to increase by the intermittent entry of pressure liquid which leaks from the working chamber to which the operating or wave transmitting liquid is admitted, the pressure in this working chamber, of course, varying at each oscillation from a minimum in the trough of the pressure wave to a maximum at its peak, while the pressure in the liquid spring chamber or chambers would in general not substantially exceed the mean pressure in the working chamber. The leakage occurs during the compression half of the operating wave and the accumulation of pressure in the liquid spring chamber or chambers is liable to check the transmission and throw the spring suspension out of resonance with the wave period, such resonance being necessary for efficient operation of the tool.

According to the present invention, in order to avoid the abovementioned disadvantage, the liquid spring chamber, or each of the liquid spring chambers, is provided with a relief device (such as a valve which can be set to any predetermined pressure) so that any excess of pressure in this chamber causes the liquid contained therein to be discharged and the pressure prevented from rising above a predetermined degree. To avoid waste of pressure liquid, the excess discharged from the liquid spring chamber or chambers may be led to the working chamber through a non-return valve which opens to admit the liquid during the expansion part of the liquid compressional wave and closes as the compression half of the wave is reached. The return channel is preferably provided with an accumulator or reservoir to accommodate sufficient leakage pressure liquid to steady the operation.

In order that the said invention may be clearly understood and readily carried into effect, the same will be more fully described with reference to the accompanying drawings, in which:—

Figure 1 is an axial section showing the relief valve employed with one of the single liquid spring chamber constructions forming the subject of our British patent application No. 8,276 of 1927, now Patent No. 293,087.

Figure 2 is an axial section showing diagrammatically a construction of tool having two balancing or differential liquid spring chambers each provided with the relief valve, and Figures 3 and 4 are diagrams showing two forms of relief devices which can be used in place of the relief valve.

In Figures 1 and 2 A is the body or casing of the tool, B is the percussion rod which is arranged centrally within the body A and C is the working chamber to which the operating wave-transmission liquid is admitted by means of a conduit $C^1$ (a relief valve $C^2$ being provided for this liquid). D (Figure 1) is the aforesaid single liquid spring chamber situated in the forward part of the tool body in front of the working chamber C, and $D^1$, $D^2$ (Figure 2) are the two balancing or differential liquid spring chambers replacing the single chamber D of Figure 1. E is the aforesaid relief valve which may be weight or gravity controlled or as shown controlled by a spring adjusted to permit the valve to lift when the pressure in the chamber D, or in the chambers $D^1$, $D^2$, reaches a predetermined point. The casing of the relief valve E may, as shown in Figure 1, be connected by a pipe $f$ to an accumulator F into which the surplus liquid from the chamber D is thus led and surplus liquid passed by the valve $C^2$ is also led into the accumulator by a pipe $f^1$. The said accumulator also communicates by means of a pipe $F^1$ with the casing of a spring loaded valve $F^2$ which opens inwardly and passes liquid from the accumulator F into the conduit $C^1$ during the expansion part of the liquid compressional wave in this conduit. A similar arrangement can also be used in conjunction with the construction according to Figure 2.

The aforesaid relief valve E may be replaced by any other suitable device for relieving the pressure. For example, we may employ a constriction such as a small tube of varying cross-sectional area, a tube with perforated partitions, or several capillary tubes arranged in parallel and adapted to be cut out as required. Figure 3 shows a relief device comprising a tube $E^1$ provided with internal blocks $e^1$, $e^1$ having bores of smaller diameter than the bore of the tube, thus providing a conduit of varying diameter. Figure 4 shows a relief device comprising two sets of capillary tubes $E^2$, $E^2$ the flow of liquid to which can be cut off by means of screw-threaded plugs $e^2$, $e^2$. Although only two sets of capillary tubes are shown, more than two such sets and plugs may be employed.

What we claim and desire to secure by Letters Patent of the United States is:—

1. In a liquid wave transmission tool, the combination with the moving element, a working chamber for said element and at least one liquid spring chamber in which part of said element is disposed, of a relief device for enabling excess liquid to be automatically discharged from said liquid spring chamber during the operation of the tool.

2. In a liquid wave transmission tool, the combination with the moving element, a working chamber for said element and at least one liquid spring chamber in which part of said element is disposed, of a relief device in the form of a non-return valve for enabling excess liquid to be automatically discharged from said liquid spring chamber during the operation of the tool.

3. In a liquid wave transmission tool, the combination with the moving element, a working chamber for said element and a single liquid spring chamber in which part of said element is disposed, of a relief device for enabling excess liquid to be automatically discharged from said liquid spring chamber during the operation of the tool.

4. In a liquid wave transmission tool, the combination with the elements claimed in claim 1, of means for leading the excess liquid to the working chamber.

5. In a liquid wave transmission tool, the combination with the elements claimed in claim 1, of a conduit leading from the relief device to the working chamber and a non-return valve which opens to admit the excess liquid to said working chamber during the expansion part of the liquid compressional wave and closes as the compression half of the wave is reached.

6. In a liquid wave transmission tool, the combination with the elements claimed in claim 1, of a conduit leading from the relief device to the working chamber and a non-return valve which opens to admit the excess liquid to said working chamber during the expansion part of the liquid compressional wave and closes as the compression half of the wave is reached, and an accumulator arranged in said conduit.

7. In a liquid wave transmission tool, the combination with the elements claimed in claim 1, of a conduit leading from the relief device to the working chamber and a non-return valve which opens to admit the excess liquid to said working chamber during the expansion part of the liquid compressional wave and closes as the compression half of the wave is reached, an accumulator arranged in said conduit, a relief device for the liquid in said working chamber and a conduit leading the excess liquid from said working chamber into said accumulator.

WILLIAM RUSSELL DEGENHARDT.
ALLAN FRED de FRAINE.
ROBERT ALAN WIMBERLEY BICKNELL,
ARTHUR BICKNELL,
*Administrators for Robert Henry Bicknell, Deceased.*